United States Patent

Narukawa

[11] Patent Number: 5,438,185
[45] Date of Patent: Aug. 1, 1995

[54] IC CARD APPARATUS FOR CONNECTING A REFERENCE POTENTIAL TERMINAL OF A CARD CONNECTOR TO A MAIN FRAME WITHOUT A DATA TRANSFER CONTROL PORTION BEING CONNECTED THEREBETWEEN

[75] Inventor: Toshiki Narukawa, Nagoya, Japan

[73] Assignee: Brother Kogyo Kabushiki Kaisha, Nagoya, Japan

[21] Appl. No.: 128,748

[22] Filed: Sep. 30, 1993

Related U.S. Application Data

[63] Continuation of Ser. No. 718,650, Jun. 21, 1991, abandoned.

[30] Foreign Application Priority Data

Jun. 27, 1990 [JP] Japan ................ 2-169167
Jun. 27, 1990 [JP] Japan ................ 2-169168

[51] Int. Cl.6 .................................... G06K 19/00
[52] U.S. Cl. .................... 235/441; 395/283; 364/237; 364/929.4; 364/DIG. 2
[58] Field of Search ............ 235/441, 379 T, 492 T, 235/460 T; 395/200, 250, 275; 364/200, 900

[56] References Cited

U.S. PATENT DOCUMENTS

| | | | |
|---|---|---|---|
| 3,831,008 | 8/1974 | Bradshaw | 235/441 |
| 4,292,480 | 9/1981 | Sweatt | 179/175.2 |
| 4,683,372 | 7/1987 | Matsumoto | 235/492 |
| 4,692,601 | 9/1987 | Nakano | 235/380 |
| 4,695,925 | 9/1987 | Kodai et al. | 361/395 |
| 4,709,136 | 11/1987 | Watanabe | 235/379 |
| 4,767,918 | 8/1988 | Kushima et al. | 235/441 |
| 4,780,603 | 10/1988 | Hamada | 235/492 |
| 4,800,520 | 1/1989 | Iijima | 364/900 |
| 4,827,111 | 5/1989 | Kondo | 235/380 |
| 4,896,028 | 1/1990 | Kushima | 235/492 |
| 4,926,034 | 5/1990 | Banjo et al. | 235/441 |
| 4,990,760 | 2/1991 | Tomari et al. | 235/492 |
| 5,003,594 | 3/1991 | Shinagawa | 380/24 |
| 5,009,106 | 4/1991 | Kiku | 361/424 |
| 5,034,596 | 7/1991 | Utsunomiya | 235/380 |
| 5,034,599 | 7/1991 | Hirata | 235/438 |
| 5,072,103 | 12/1991 | Nara | 235/492 |
| 5,091,618 | 2/1992 | Takahashi | 235/441 |
| 5,092,799 | 3/1992 | Kimura | 439/924 |
| 5,126,548 | 6/1992 | Sekiguchi | 235/492 |
| 5,206,783 | 4/1993 | Mori et al. | 361/212 |

Primary Examiner—Christopher B. Shin
Attorney, Agent, or Firm—Oliff & Berridge

[57] ABSTRACT

An electronic apparatus including a card connector to which an IC card is connectable and which has a reference potential terminal for connection to a ground terminal of the IC card, and further including a control portion capable of sending and receiving signals to and from the IC card through the card connector and having a same reference potential as the main frame of the apparatus. A circuit is provided for connecting the reference potential terminal of the card connector to the main frame, without the control portion being connected therebetween. The control portion may uses a CPU which requires an acknowledge signal indicative of completion of data transfer to or from the IC card, to continue the operation. In this case, a signal generator is provided for generating the acknowledge signal in response to a card-insertion signal generated upon connection of the IC card to the card connector and a data-transfer signal generated when the data transfer occurs.

7 Claims, 7 Drawing Sheets

IC CARD APPARATUS FOR CONNECTING A REFERENCE POTENTIAL TERMINAL OF A CARD CONNECTOR TO A MAIN FRAME WITHOUT A DATA TRANSFER CONTROL PORTION BEING CONNECTED THEREBETWEEN

This is a continuation of application Ser. No. 07/718,650 filed Jun. 21, 1991, now abandoned.

BACKGROUND OF THE INVENTION

1. Field of the Invention

The present invention relates in general to an electronically operated apparatus using an integrated-circuit memory in the form of an IC card, and more particularly to an arrangement for electrical connection between a ground terminal of an IC card and the main frame of the electronic apparatus. Further, the invention is concerned with such an electronic apparatus that uses as a control unit a central processing unit which requires an acknowledge signal upon data transfer to and from the IC card.

2. Discussion of the Prior Art

There is known an electronic apparatus such as a printer or a personal computer which uses an integrated-circuit card or IC card as an external memory device. Such an electronic apparatus includes (a) a main frame, (b) a card receptacle including a card connector to which an IC card is connectable and which has a reference potential terminal for connection to a ground terminal of the IC card, (c) a control portion capable of sending and receiving signals to and from the IC card through the card connector and having a reference potential equal to that of the main frame. The IC card, which includes as a major component a semiconductor IC memory element, is standardized in Japan by the Japanese Electronic Industry Development Association (JEIDA). The JEIDA Standard requires the IC card to be inserted in the card receptacle provided on an electronic apparatus such that the terminals of the IC card are connected to the respective terminals provided in the card connector of the receptacle, to permit data transfer between the IC card and the apparatus. Further, the above Standard requires the ground terminal of the IC card to be connected to the reference potential terminal of the card connector. Generally, the reference potential terminal of the card connector is connected to a part of the control portion of the apparatus which has a reference potential, that is, connected to a signal ground (apparatus SG) of the control portion, so that the reference potential of the IC card is equal to that of the apparatus SG.

Usually, the ground terminal of the IC card is connected to a signal ground (card SG) of the substrate of the IC card. IC cards produced by some manufacturers have a covering frame which is connected to the card SG via springs or other conductive members. In this case, the covering frame serves as a card frame ground (card FG), which is connected to the apparatus SG. According to this arrangement, the apparatus SG may be exposed to static electricity generated by the card FG, and the control portion of the apparatus tends to suffer from malfunctioning due to the static electricity. Also, noises produced by the control portion may radiate from the card FG which functions as an antenna. Thus, the IC card having the card FG has an adverse influence on the noise-free operation of the electronic apparatus.

On the other hand, the control portion of some electronic apparatus incorporates a central processing unit (CPU) as a control unit which requires an acknowledge signal indicative of completion of a data transfer to and from an IC card. A 16-bit CPU 6800 available from Motorola Semiconductor, U.S.A., is an example of such control CPU. When an electronic apparatus incorporating such control CPU uses an IC card as an optional memory, the control CPU should be supplied with the above-indicated acknowledge signal when the data transfer takes place between the control CPU and the IC card.

However, some IC cards such as those in the process of standardization by the JEIDA do not have an output terminal for the acknowledge signal indicated above, and cannot be used for an electronic apparatus which uses a control CPU that requires the acknowledge signal.

SUMMARY OFT HE INVENTION

It is therefore a first object of the present invention to provide an electronic apparatus which permits a noise-free operation even with an IC card whose signal ground is connected to a covering frame thereof.

A second object of the invention is to provide an electronic apparatus which uses a central processing unit as a control unit that requires an acknowledge signal for data transfer and which can use an IC card having no output terminal for the acknowledge signal.

The first object may be achieved according to one aspect of the present invention, which provides an electronic apparatus comprising: (a) a main frame; (b) a card receptacle including a card connector to which an IC card is connectable, the card connector having a reference potential terminal for connection to a ground terminal of the IC card; (c) a control portion capable of sending and receiving signals to and from the IC card through the card connector, the control portion having a reference potential equal to that of the main frame; and (d) connecting means for connecting the reference potential terminal of the card connector to the main frame, without the control portion being connected between the reference potential terminal and the main frame.

The electronic apparatus constructed according to the first aspect of the present invention as described above is adapted such that the signal ground (card SG) connected to the ground terminal of the IC card is connected to the reference potential terminal of the card connector when the IC card is installed in the card receptacle. Since the reference potential terminal is connected to the main frame of the apparatus (apparatus FG) by the connecting means, without the control portion (apparatus SG) being connected between the reference potential terminal and the main frame, the static electricity generated by the covering frame (card FG) if provided on the IC card will flow to the main frame (apparatus FG), without passing through the control portion (apparatus SG). Thus, the connecting means effectively eliminates otherwise possible malfunctioning of the control portion of the apparatus due to the static electricity. This arrangement is also effective to prevent otherwise possible radiation of the noises of the control portion from the covering frame (card FG) of the IC card serving as an antenna, thereby assuring noise-free data processing in the electronic apparatus.

Further, since the control portion (apparatus SG) of the apparatus is connected to the main frame (apparatus FG), the apparatus SG has the same reference potential as the card SG (ground terminal of the IC card), even though the card SG is connected to the apparatus FG (main frame of the apparatus) upon insertion of the IC card in the apparatus. Thus, the present apparatus performs data processing operations in the same manner as in the known apparatus wherein the apparatus SG and the card SG are directly connected to each other.

While the present electronic apparatus is preferably operated with an IC card which includes a covering frame (card FG) to which the ground terminal of the card (card SG) is connected. However, the present apparatus may use an IC card whose signal ground SG is not connected to a covering frame (card FG). In this case, too, the present apparatus permits noise-free data processing operations.

The noise characteristic of the IC card differs from one type to another. For example, an IC card whose signal ground (card SG) is not connected to a covering frame (card FG) may be exposed to reduced noises when the card SG is connected to the apparatus FG (main frame of the apparatus), than when the same is connected to the apparatus SG (control portion of the apparatus), or vice versa. When an experiment shows that the IC card is exposed to comparatively reduced noises when the card SG is connected to the apparatus SG, it is better to connect the reference potential terminal of the card connector to the control portion of the apparatus (apparatus SG), rather than to the main frame (apparatus FG). In this respect, the connecting means may preferably include disconnecting means and connector means. More specifically, the disconnecting means normally connects the reference potential terminal to the main frame and can be manipulated outside the main frame, for disconnecting the reference potential terminal from the main frame. On the other hand, the connector means normally disconnects the reference potential terminal from the control portion and can be manipulated outside the main frame, for connection of the reference potential terminal to the control portion. According to this preferred arrangement, the connector means permits the reference potential terminal of the card connector selectively to the main frame (apparatus FG) or the control portion (apparatus SG), as needed.

The second object indicated above may be achieved according to another aspect of the present invention, which provides an electronic apparatus comprising: (a) a card receptacle including a card connector to which an IC card is connectable; (b) a control portion capable of sending and receiving data to and from the IC card through the card connector, the control portion including a central processing unit which receives an acknowledge signal indicative of completion of a data transfer to or from the IC card and which continues to effect data processing operation upon reception of the acknowledge signal; (c) means for generating a card-insertion signal when the IC card is connected to the card connector of the card receptacle; (d) means for generating a data-transfer signal upon the data transfer between the central processing unit and the IC card; and (e) an acknowledge-signal generator circuit responsive to the card-insertion signal and the data-transfer signal, to generate a pseudo-acknowledge signal and applying the pseudo-acknowledge signal as the acknowledge signal to the central processing unit.

According to the electronic apparatus constructed according to the second aspect of the present invention as described above, a card-insertion signal such as a card-recognition signal CD is generated when the IC card is connected to the card connector of the card receptacle of the apparatus. The card-insertion signal indicates the installation or insertion of the card in the card receptacle. Further, a data-transfer signal such as a chip-enable signal CE, a read-enable signal RE or a write-enable signal WE is generated when data transfer takes place between the central processing unit of the apparatus and the IC card. The chip-enable signal CE is generated upon data transfer from the central processing unit to the IC card or vice versa. The read-enable signal RE is generated upon reading of data from the IC card, while the write-enable signal RE is generated upon writing of data on the IC card. When the levels of these card-insertion signal and data-transfer signal indicate the insertion of the IC card and the data transfer, the acknowledge-signal generator circuit generates a pseudo-acknowledge signal, which is applied as the acknowledge signal to the central processing unit. In the presence of the card-insertion signal, the data transfer between the control portion of the apparatus and the IC card can be suitably effected when the data-transfer signal is outputted, as long as there exists no abnormality or defect in the hardware and software of the apparatus and the IC card. If there exists an abnormality, this fact is usually detected in an early period of signal processing for the data transfer. Thus, the pseudo-acknowledge signal generated by the acknowledge-signal generator circuit has substantially the same function as the acknowledge signal which indicates the completion of a data transfer operation between the control portion and the IC card.

As described above, the present electronic apparatus is adapted to apply the pseudo-acknowledge signal as the acknowledge signal to the central processing unit, in response to the card-insertion and data-transfer signals, so that the central processing unit may continue to effect data processing operation upon reception of the pseudo-acknowledge signal. This arrangement permits the use of an IC card which does not have an output terminal for the acknowledge signal indicative of the completion of the data transfer to and from the IC card.

The card-insertion signal may be a card-recognition signal CD which has a low level when the IC card is connected to the card connector of the apparatus, while the data-transfer signal may be a chip-enable signal CE which has a low level when data is read from or written on the IC card. In this instance, the acknowledge-signal generator circuit may use an AND circuit which receives the card-recognition signal CD and the chip-enable signal CE, so that the AND circuit generates as the acknowledge signal ACK a pseudo-acknowledge signal ACK' having a low level, when the levels of the card-recognition and data-transfer signals are both low.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
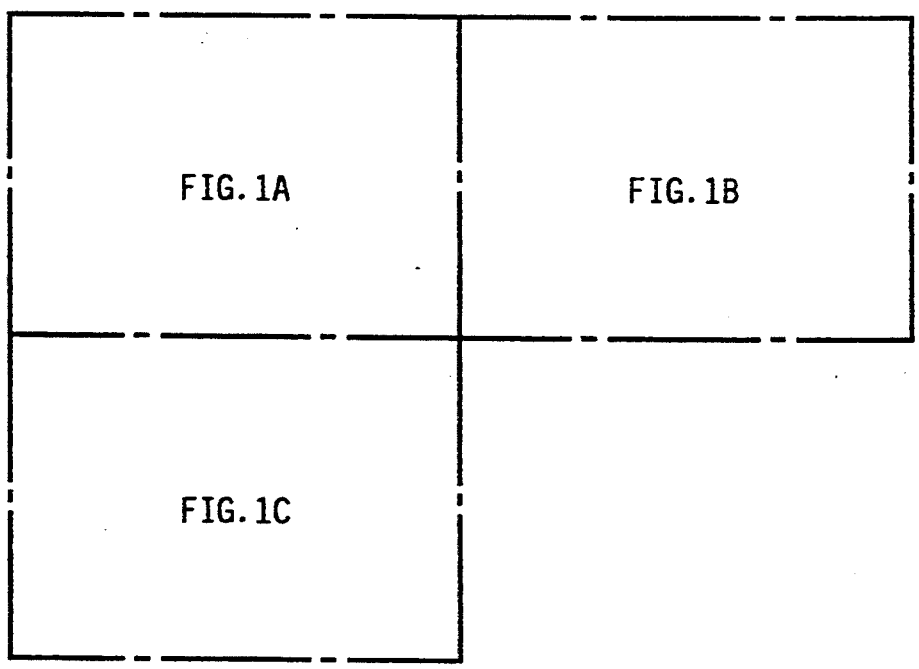
FIGS. 1, 1A, 1B, and 1C are a block diagram showing one embodiment an electronic apparatus of the present invention in the form of a laser printer.
Figure 1A:
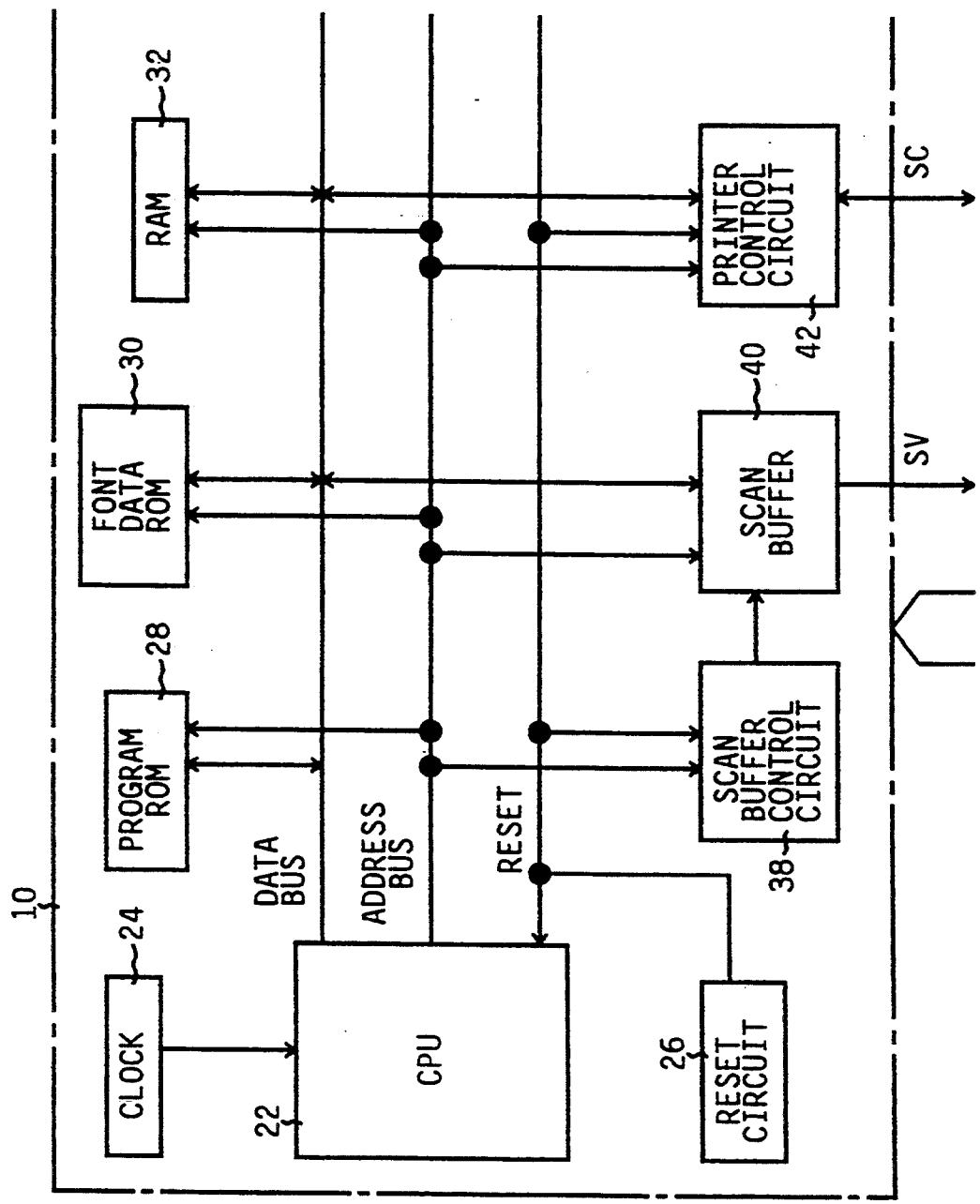
Figure 1B:
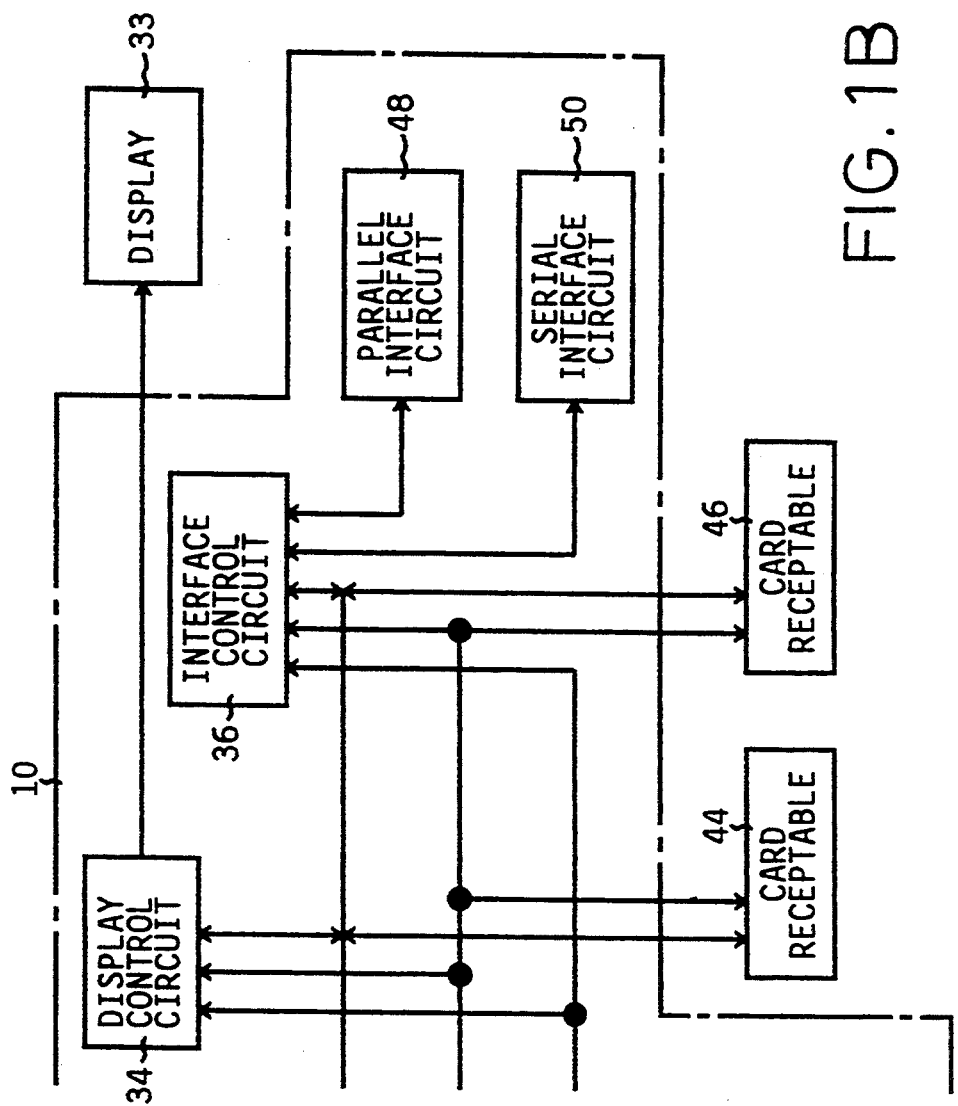
Figure 1C:
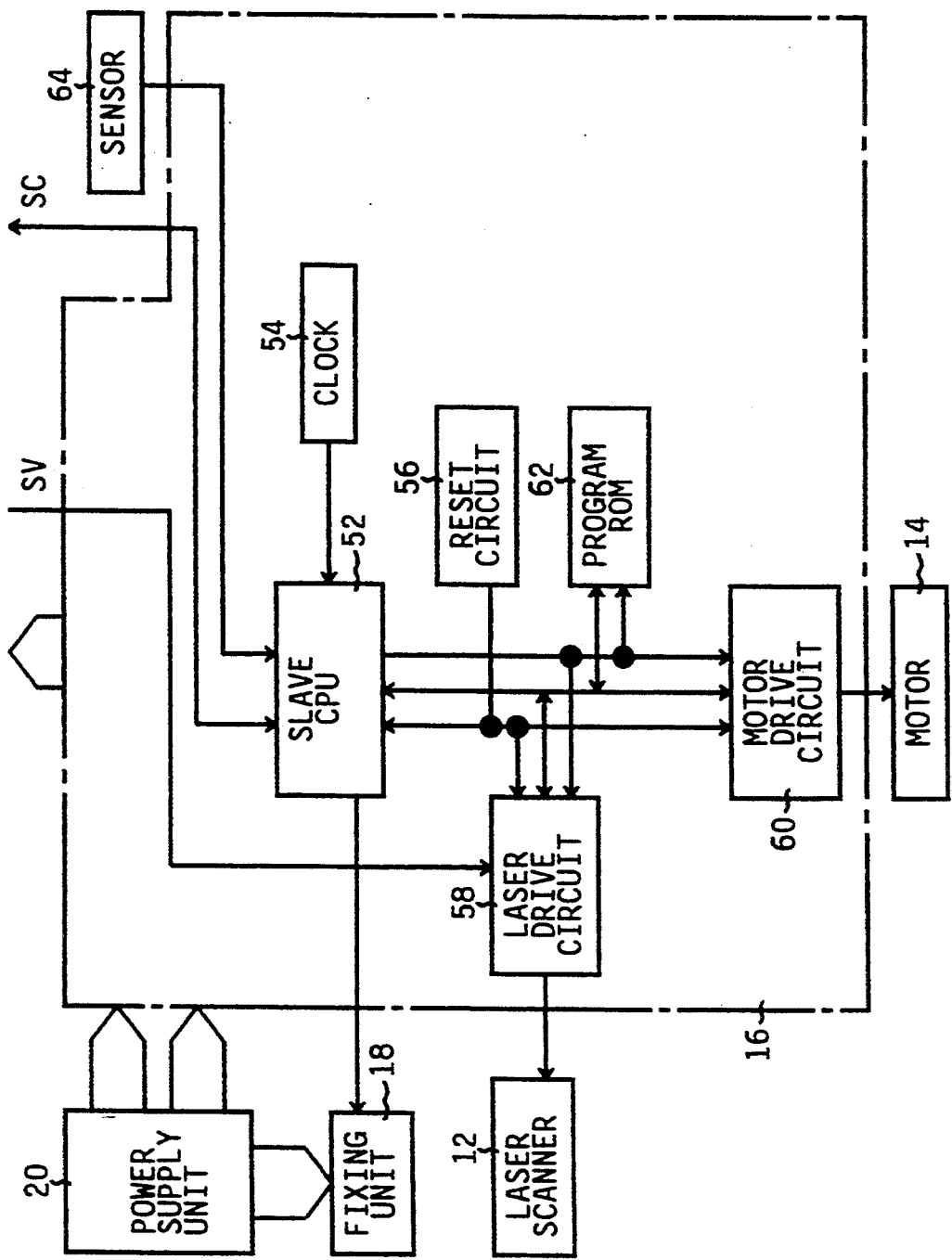

Referring first to the block diagram of FIG. 1, the laser printer embodying the present invention includes: a control portion in the form of a video controller 10 for producing a VIDEO signal SV based on input data received from an external host computer; a DC controller 16 for driving a laser scanner 12 and a paper feed motor 14, based on the VIDEO signal SV received from the video controller 10; and a power supply unit 20 for applying power to the video controller 10, DC controller 16 and an image fixing unit 18.

The video controller 10 incorporates: a CPU (central processing unit) 22; a clock 24; a reset circuit 26; program ROM (read-only memory) 28; a font data ROM 30 (read-only memory) 30; a RAM (random-access memory) 32; a display control circuit 34 for controlling a display unit 33; an interface control circuit 36; a scan buffer control circuit 38; a scan buffer 40; a printer control circuit 42; a parallel interface circuit 48; and a serial interface circuit 50. The laser printer has two card receptacles 44, 46 which are connected to the video controller 10.

The data from the external host computer is received by the parallel and serial interface circuits 48, 50, and are stored in the RAM 32 through the interface control circuit 36. The CPU 22 retrieves from the font data ROM 30 font data corresponding to the data stored in the RAM 32, and prepares the corresponding printing data. The prepared printing data is stored in the scan buffer 40, and is sent to the DC controller as a VIDEO signal SV, according to a PRINTER CONTROL signal SC which is transferred between the printer control circuit 42 of the video controller 10 and the DC controller 16.

The DC controller 16 incorporates: a slave CPU (central processing unit) 52; a clock 54; a reset circuit 56; a laser drive circuit 58; a motor drive circuit 60; and a program ROM (read-only memory) 62. The VIDEO signal SV received from the video controller 10 is converted by the laser drive circuit 58 into laser ON/OFF signals for controlling the laser scanner 12 so as to irradiate the appropriate local spots on a recording medium, with a laser beam, according to the laser ON/OFF signals, so that an image corresponding to the font data retrieved from the font data ROM 30 is formed on the recording medium. As the laser printing is thus effected according to the laser ON/OFF signals, the paper feed motor 14 is activated intermittently according to a control signal from the motor drive circuit 60, to feed the recording medium. The sensor 64 is provided to detect abnormality of the laser printer. A signal generated by the sensor 64 is applied to the slave CPU 52. For the understanding of the present invention, further details on the printing operation are deemed unnecessary.

Figure 2:
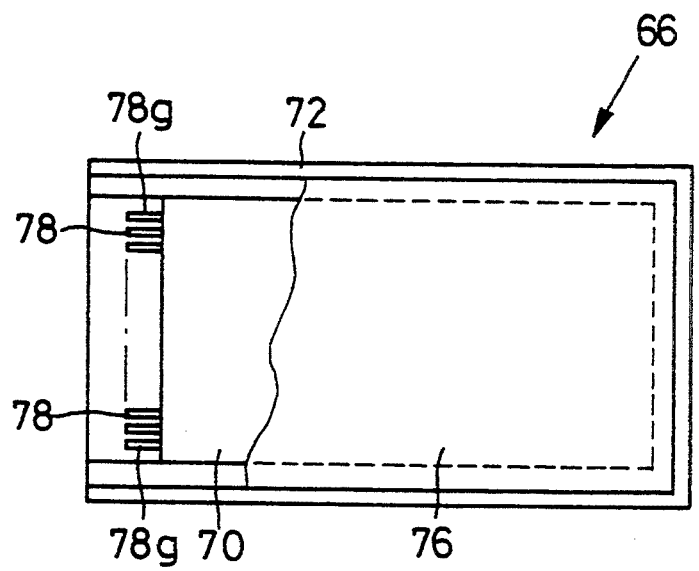
FIG. 2 is a partly cut-away plan view of an IC card usable on the laser printer of FIG. 1.

The card receptacles 44, 46 connected to the video controller 10 are provided to receive integrated-circuit memory cards (hereinafter referred to as "IC cards") as generally indicated at 66 in FIGS. 2 and 3. The IC card 66, which is optionally available as desired by the user of the laser printer, conforms with the JEIDA Standard, for example. The IC card 66 includes a printed-wiring board 70, a semiconductor IC 68 mounted on the board 70, a resin frame 72 formed along three sides of the board 70 so as to retain the board 70, and a covering frame in the form of a pair of aluminum plates 76, 76 which is attached to the resin frame 72 so as cover the opposite major surfaces of the board 70. The printed-wiring board 70 has a signal ground (card SG) which is electrically connected to the covering aluminum plates 76, 76 through a pair of springs 74, 74. Thus, the covering frame consisting of the aluminum plates 76 serves as a frame ground (card FG) of the IC card 66.

Figure 3:
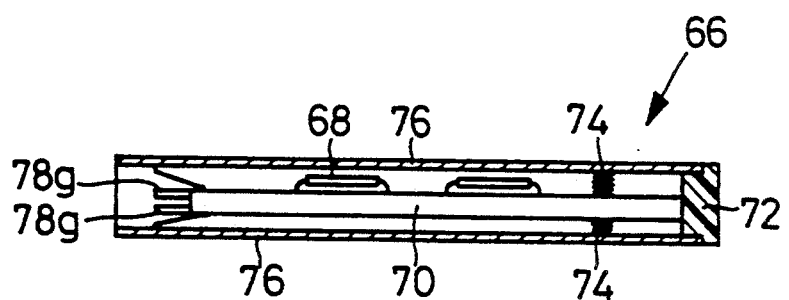
FIG. 3 is an elevational view in longitudinal cross section of the IC card of FIG. 2.

The printed-wiring board 70 has a multiplicity of connector pins 78 which extend from one end thereof, which end corresponds to the fourth side of the board exposed through an opening of the resin frame 72, as indicated in FIG. 3. According to the JEIDA Standard, the connector pins 78 are arranged in a predetermined order in two parallel straight rows one above the other. Of these connector pins 78, the pins Nos. 1, 34, 35 and 68 which are disposed at the opposite ends of the rows are assigned to function as ground terminals 78g.

Figure 4:
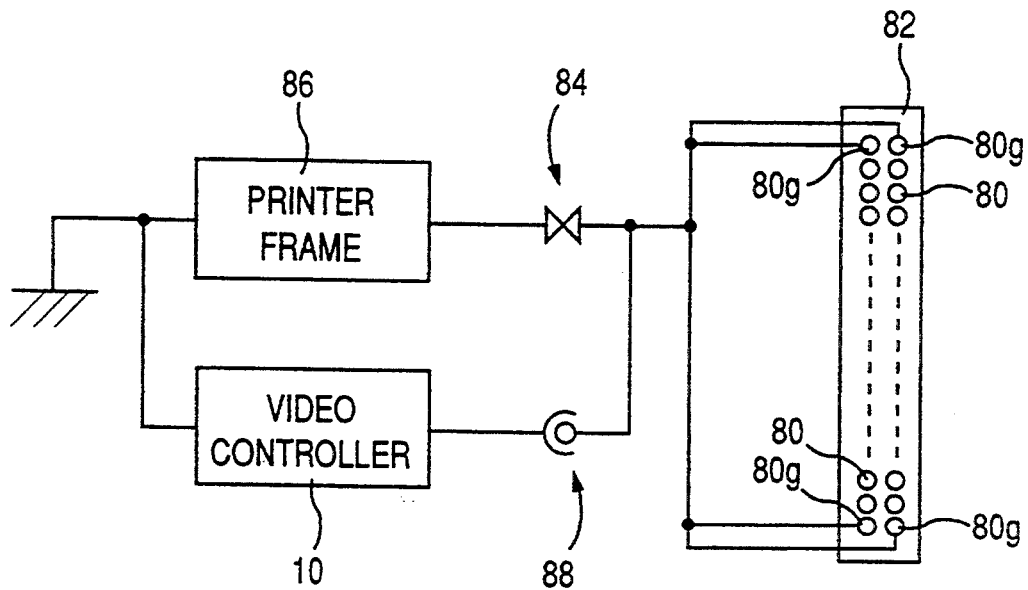
FIG. 4 is a view illustrating a circuit connecting reference potential terminals of a card connector of the apparatus of FIG. 1 to a signal ground of the apparatus.

Each of the two card receptacles 44, 46 has a card connector 82 which has a multiplicity of pin holes 80 arranged in two rows, as shown in FIG. 4. These pin holes 80 are provided to receive the respective connector pins 78 when the IC card 66 is installed or inserted in the appropriate card receptacle 44, 46. With the IC card 66 inserted in the receptacle 44, 46, the card 66 is connected to various portions of the video controller 10 through the appropriate pairs of the connector pins and pin holes 78, 80, so that data can be transferred between the individual portions of the controller 10 and the IC card 66.

As shown in FIG. 4, the pin holes 80 corresponding to the ground terminals 78g of the IC card 66 serve as reference potential terminals 80g which are connected to a main frame 86 of the laser printer, through a cut point 84. Further, the reference potential terminals 80g of the card connector 82 can be connected through a solder point 88 to a signal ground (apparatus SG) of the video controller 10, which serves as a control portion of the laser printer. The main frame 86 serves as a frame ground (apparatus FG) of the laser printer. The signal ground of the video controller 10 (apparatus SG) is connected to the main frame 86 (apparatus FG), so that the video controller 10 and the main frame 86 have the same reference potential.

At the cut point 84, there is provided suitable disconnecting means which normally connects the reference potential terminals 80g to the main frame 86. This disconnecting means is accessible outside the main frame 86 of the laser printer, so that the reference potential terminals 80g are disconnected from the main frame 86, by suitable manipulation of the disconnecting means. At the solder point 88, on the other hand, there is provided suitable connector means which normally inhibits electrical connection between the reference potential terminals 80g and the video controller 10 (apparatus SG).

Like the disconnecting means at the cut point 84, the connector means is accessible outside the main frame 86, so that the reference potential terminals 80g are connected to the video controller 10 (apparatus SG), upon suitable manipulation of the connector means. In the present embodiment, the disconnecting means at the cut point 84 consists of a part of a conductor wire or a normally-closed disconnect switch, while the connector means provided at the solder point 88 consists of two terminals (ends of conductor wires) which are normally separated from each other and are connectable to each other by soldering.

Thus, the present laser printer has connecting means (84, 88) for normally connecting the signal ground (card SG) of the IC card 66 to the main frame 86 (apparatus FG) and for normally disconnecting the signal ground of the IC card 66 from the video controller 10 (apparatus SG). However, the signal ground of the IC card 66 (card SG) can be connected to the signal ground of the video controller 10 (apparatus SG) by manipulating the connector means (by soldering) at the solder point 88, and by manipulating the disconnecting means (cutting a conductive wire or turning off a disconnect switch) at the cut point 84, so as to disconnect the reference potential terminals 80g from the main frame 86. The disconnecting means and the connector means at the cut and solder points 84, 88 may be protected by suitable covering means.

In the present laser printer, the card SG (signal ground of the board 70 connected to the ground terminals 78g is normally connected to the apparatus. According to this arrangement, the static electricity generated by the card FG (covering frame 76) will flow into the apparatus FG (main frame 86), without passing through the apparatus SG (video controller 10), even where the card SG is connected to the card FG. Accordingly, otherwise possible malfunctioning of the video controller 10 due to the static electricity can be effectively avoided. Further, noises generated by the video controller 10 will not radiate from the card FG with the card FG acting as an antenna. Thus, the present laser printer performs a noise-free data processing operation, with the IC card or cards 66 inserted in the card receptacle or receptacles 44, 46.

Further, since the apparatus SG is connected to the apparatus FG, the apparatus SG has the same reference potential as the card SG, even though the card SG is connected to the apparatus FG upon insertion of the IC card or cards 66 in the card receptacle or receptacles 44, 46. Thus, the present laser printer performs data processing operations in the same manner as in the known apparatus wherein the apparatus SG and the card SG are directly connected to each other. It is also noted that the arrangement of FIG. 4 permits the use of an IC card whose signal ground SG (card SG) is not connected to a covering frame (card FG). In this case, too, the data processing operation can be performed with reduced noises.

According to the present embodiment, the card SG is connected to either the apparatus FG or the apparatus SG, as needed, depending upon the noise characteristic of the specific IC card to be used, since the card SG which is normally connected through the cut point 84 to the apparatus FG (main frame 86) may be connected to the apparatus SG (video controller 10), by manipulating the disconnecting means at the cut point 84 and the connector means at the solder point 88. When an IC card whose card SG is not connected to the card FG is used, for example, the IC card is tested for its noise characteristic, and the card SG is connected to the apparatus SG if the test shows that this connection is better for reduced noises.

While the present invention as applied to a laser printer has been described above by reference to FIGS. 1-4, the principle of the invention is equally applicable to a personal computer and other electronic apparatus which uses an IC card.

Although the cut point 84 and the solder point 88 are provided for normal connection of the reference potential terminals 80g to the main frame 86 and optional connection of the terminals 80g to the video controller 10, the cut and solder points 84, 88 may be eliminated, and the terminals 80g are permanently connected to the main frame 86 and cannot be connected to the video controller 10.

In the illustrated laser printer, the IC card 66 used conforms with the JEIDA Standard. However, the arrangement of FIGS. 1 and 4 is applicable to any electronic apparatus using an IC card which conforms with the other standards and whose signal ground SG may be connected to a covering frame ground FG.

Figure 5:
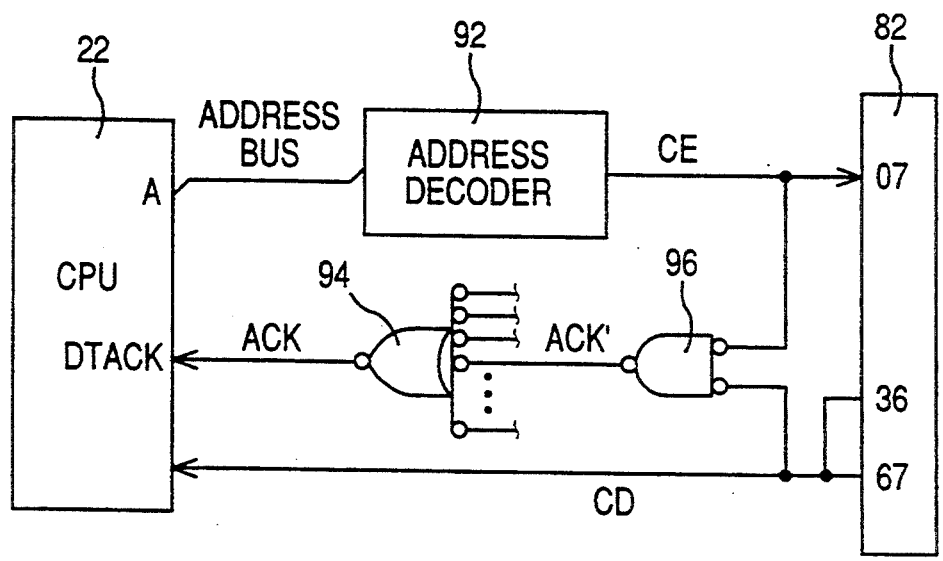
FIG. 5 is a view illustrating a circuit for producing a PSEUDO-ACKNOWLEDGE signal in the apparatus of FIG. 1.
Figure 6:
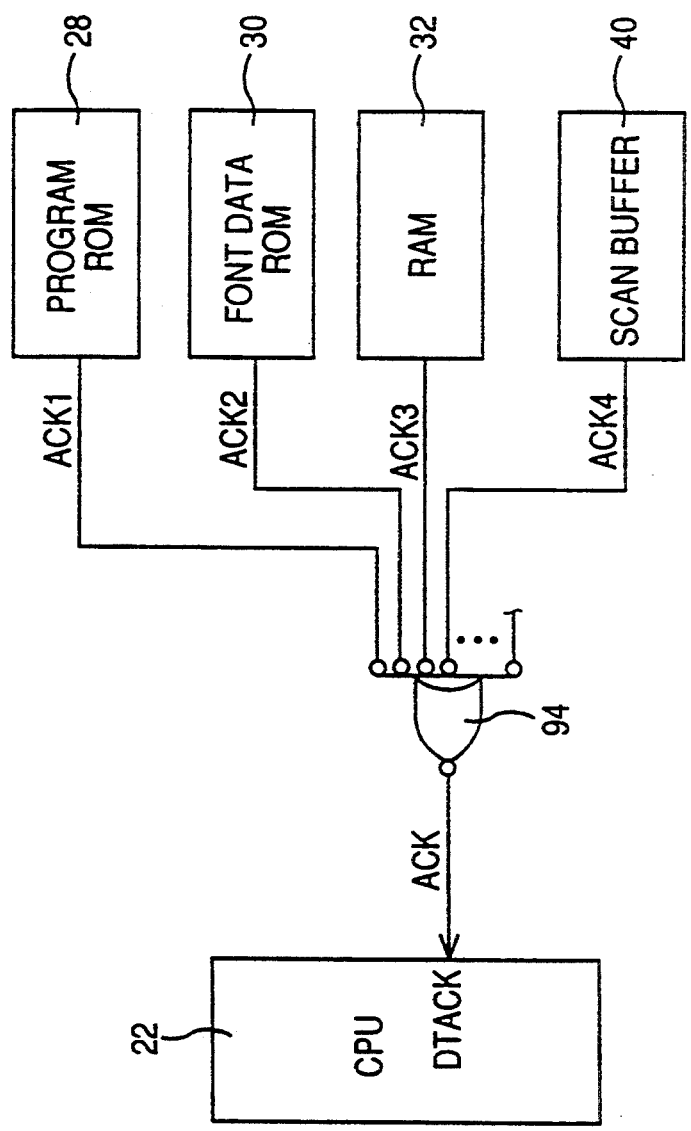
FIG. 6 is a view indicating various SUB-ACKNOWLEDGE signals generated from various components to apply an ACKNOWLEDGE signal to a CPU of the apparatus of FIG. 1.

Referring next to FIGS. 5 and 6, there will be described another embodiment of the present invention in the form of the laser printer of FIGS. 1-4 which has an additional feature as described below.

In this second embodiment, a card-insertion signal in the form of a CARD-RECOGNITION signal CD is applied to the CPU 22 when the connector pins 78 having identification Nos. 36 and 67 are received in the appropriate pin holes 80 of the card connector 82, upon installation or insertion of the IC card 66 in the card receptacle 44, 46. More specifically, the CARD-RECOGNITION signal CD has a high level while the IC card 66 is not connected to the card connector 82. The level of the signal CD is made low when the IC card 66 is connected to the card connector 82, with the connector pins Nos. 36, 67 received in the appropriate pin holes 80. The signal CD having a low level indicates that the IC card 66 is received in position in the card receptacle 44, 46. When the IC card 66 inserted in the receptacle 44, 46 is accessed by the CPU 22 upon data transfer between the video controller 10 and the IC card 66, a CHIP-ENABLE signal CE is applied from an address decoder 92 to the IC card 66, via the pin hole 80 and the corresponding connector pin 78 which are numbered 07. Like the CARD-RECOGNITION signal CD, this CHIP-ENABLE signal CE is a low-level active signal whose level is made low when data is read from or written on the IC card 66.

The CPU 22 is a central processing unit which continues to effect data processing operation in response to an ACKNOWLEDGE signal ACK received at a terminal DTACK thereof. Described in detail by reference to FIG. 6, the video controller 10 has a low-level active OR circuit 94 which is adapted to receive signals ACK1, ACK2, ACK3, ACK4, etc. from the program ROM 28, font data ROM 30, RAM 32, scan buffer 40, etc., when the data transfer to and from these elements is completed. When any one of the signals ACK-1–ACK4, etc. has a low level, the ACKNOWLEDGE signal ACK is applied from the OR circuit 94 to the CPU 22.

The IC card 66 conforming with the JEIDA Standard does not have an output terminal for generating an acknowledge signal indicative of the data transfer to or from the IC card. Therefore, when the IC card 66 is accessed for data transfer to and from the video controller 10, no acknowledge signal is applied to the CPU 22, and the CPU 22 cannot continue to operate normally with this IC card 66. To overcome this defect, the video controller 10 uses a low-level active AND circuit 96 which is adapted to receive the CARD-RECOGNITION and CHIP-ENABLE signals CD, CE described above, as indicated in FIG. 5. Namely, when the levels of the signals CD and CE are both low, the AND circuit 96 applies a PSEUDO-ACKNOWLEDGE signal ACK' having a low level to the OR circuit 94, whereby the ACKNOWLEDGE signal ACK is sent from the circuit 94 to the CPU 22. According to this arrangement, the CPU 22 can continue to effect normal data processing operation with the IC card 66, even though an acknowledge signal is not sent from the IC card 66 to the CPU 22.

The PSEUDO-ACKNOWLEDGE signal ACK' is made low and the ACKNOWLEDGE signal ACK is applied to the CPU 22, when the levels of the CARD-RECOGNITION and CHIP-ENABLE signals CD and CE are both low. While the level of the CARD-RECOGNITION signal CD is low with the IC card 66 correctly connected to the card connector 82, the level of the CHIP-ENABLE signal CE is made low when the IC card 66 is accessed by the CPU 22, whereby the data transfer between the video controller 10 and the IC card 66 can be effected in the normal manner, provided there exists no abnormality in the hardware and software of the printer. In the event of occurrence of any abnormality, the abnormality is usually detected in an early period of signal processing for the relevant data transfer, and therefore the PSEUDO-ACKNOWLEDGE signal ACK' has substantially the same function as the signals ACK1-ACK4, etc., which indicate the completion of data transfer to and from the components 28, 30, 32, 40, etc. of the controller 10.

As described above, the second embodiment is adapted such that the PSEUDO-ACKNOWLEDGE signal ACK' is produced by the AND circuit 96, based on the CARD-RECOGNITION and CHIP-ENABLE signals CD, CE, so that the ACKNOWLEDGE signal ACK is applied to the CPU 22 when the signal ACK' is applied to the OR circuit 94. Accordingly, the laser printer according to the second embodiment can be normally operated with the IC card 66 which does not have a terminal for generating an acknowledge signal.

Since only the low-level active AND circuit 96 is required to produce the PSEUDO-ACKNOWLEDGE signal ACK' based on the signals CD and CE that are usually provided on an electronic apparatus using an IC card, the present laser printer is available without significantly complicating the video controller 10 or increasing the cost of manufacture.

It will be understood that the AND circuit 96 serves as a signal generator circuit for generating the PSEUDO-ACKNOWLEDGE signal ACK', based on a card-insertion signal in the form of the CARD-RECOGNITION signal CD, and a data-transfer signal in the form of the CHIP-ENABLE signal CE.

While the second embodiment described above takes the form of a laser printer, a signal generator circuit including the AND circuit 96 as shown in FIG. 5 may be provided in a personal computer or any electronic apparatus which uses an IC card or cards.

The card-insertion signal is not limited to the CARD-RECOGNITION signal CD, but may be any signal which is generated upon connection of the IC card 66 to the card connector 82, or which is supplied from the IC card 66 connected to the card connector 82.

The CHIP-ENABLE signal CE used as the data-transfer signal may be replaced by a read-enable signal RE generated upon reading of data from the IC card 66, or a write-enable signal WE generated upon writing of data on the IC card 66.

It is possible that the PSEUDO-ACKNOWLEDGE signal ACK' is generated based on three or more signals applied to the AND circuit 96.

While the IC card 66 used in the second embodiment conforms with the JEIDA Standard, the feature of the second embodiment is applicable to any IC card according to any standards, which does not have a terminal for sending an acknowledge signal to an electronic apparatus.

Although the IC card 66 used in the illustrated embodiments is a writable memory, the principle of the present invention is applicable to an electronic apparatus which uses a read-only IC card.

In the illustrated embodiment, the IC card 66 uses the springs 74 through which the signal ground SG of the printed-wiring board 70 is electrically connected to the covering frame consisting of the aluminum plates 76. However, the springs 74 may be eliminated.

While the laser printer according to the second embodiment incorporates the feature of the first embodiment, the feature illustrated in FIG. 5 may be provided on an electronic apparatus which does not includes the feature of the first embodiment illustrated in FIG. 4.

It is to be understood that the present invention may be embodied with various other changes, modifications or improvements, which may occur to those skilled in the art, without departing from the spirit and scope of the invention defined in the following claims.

What is claimed is:

1. An electronic apparatus comprising:
   a frame providing a frame ground reference potential;
   a card receptacle having a card connector to which an IC card is connectable, said card connector having a card connector reference potential terminal, a ground terminal of said IC card connectable to the card connector reference potential terminal;
   a control portion for sending signals to and receiving signals from said IC card through said card connector, a signal ground reference terminal of said control portion being electrically connected to said frame and having the frame ground reference potential of said frame; and
   circuit connecting means for electrically connecting said card connector reference potential terminal of said card connector directly to the frame ground reference potential of said frame, the circuit connecting means bypassing the signal ground reference terminal of said control portion to electrically isolate the signal ground reference terminal of the control portion from the card connector reference potential terminal.

2. An electronic apparatus according to claim 1, wherein said IC card includes a covering frame connected to said ground terminal.

3. An electronic apparatus according to claim 1, wherein said connecting means comprises:
   first connector means for connecting and disconnecting said card connector reference potential terminal to and from said frame, said first connector means having a connecting position connecting said card connector reference potential terminal to said frame, and a disconnecting position disconnecting said card connector reference potential terminal from said frame, said first connector means manually operable between said connection position and said disconnecting position; and second connector means for connecting and disconnecting said card connector reference potential terminal to and from said signal reference ground terminal of said control portion, said second connector means having a disconnecting position disconnecting said card connector reference potential terminal from said signal reference ground terminal of said control portion, and a connecting position connecting said card connector reference potential terminal to said signal reference ground terminal of said control portion, said second connector means manually operable between said connecting position and said disconnecting position;

wherein, when said first connector means is placed in said disconnecting position, said second connector means is placed in said connecting position.

4. An electronic apparatus according to claim 1, wherein said control portion comprises:

a central processing unit for performing data processing operations such that, after a previous data processing operation, a next data processing operation is performed only upon receipt of an acknowledge signal;

card-insertion signal means for generating a card-insertion signal when said IC card is connected to said card connector of said card receptacle;

data-transfer signal means for generating a data transfer signal upon each data transfer between said central processing unit and said IC card; and an acknowledge-signal generator circuit responsive to said card-insertion signal and said data-transfer signal, for supplying to said central processing unit said acknowledge signal when a previous data transfer between said IC card and said central processing unit is completed, said acknowledge signal permitting said central processing unit to perform a next data transfer.

5. An electronic apparatus comprising:

a card receptacle including a card connector to which an IC card is connectable;

a control portion for sending data to and receiving data from said IC card through said card connector, said control portion including a central processing unit for effecting data processing operation such that, after a previous data processing operation, a next data processing operation is performed only upon receipt of an acknowledge signal;

card-insertion signal means for generating a card-insertion signal when said IC card is connected to said card connector of said card receptacle;

data-transfer signal means for generating a data transfer signal upon a data transfer of data between said central processing unit and said IC card;

an acknowledge-signal generator circuit responsive to said card-insertion signal and said data-transfer signal, for supplying to said central processing unit said acknowledge signal when said data transfer between said IC card and the central processing unit is completed for said previous data processing operation, said acknowledge signal permitting said central processing unit to perform said next data processing operation;

a frame; and circuit connecting means;

wherein said card connector has a ground reference potential terminal connectable to a ground terminal of said IC card, and a signal ground potential terminal of said control portion is connected to said frame, the signal ground potential terminal having a potential equal to a frame ground potential of said frame, said circuit connecting means electrically connecting said ground reference potential terminal of said card connector directly to said frame, the circuit connecting means bypassing the signal ground potential terminal of said control portion to electrically isolate the signal ground terminal of said control portion from the ground reference potential terminal of said card connector.

6. An electronic apparatus according to claim 5, wherein said card-insertion signal comprises a card-recognition signal which has a low level when said IC card is connected to said card connector, while said data-transfer signal comprises a chip-enable signal which has a low level when data is read from said IC card and when data is written on said IC card.

7. An electronic apparatus according to claim 6, wherein said acknowledge-signal generator circuit further comprises an AND circuit which receives said card-recognition signal and said chip-enable signal, said AND circuit generating said acknowledge signal having a low level, when the levels of said card-recognition signal and said chip-enable signal are both low.

* * * * *